United States Patent
Gange et al.

(10) Patent No.: US 7,543,859 B1
(45) Date of Patent: Jun. 9, 2009

(54) CONNECTOR AND SPRAY SHIELD ASSEMBLY FOR LIQUID COOLING OF ELECTRONICS

(75) Inventors: Charles C. Gange, Rhinebeck, NY (US); Francis R. Krug, Jr., Highland, NY (US); Robert K. Mullady, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/181,337

(22) Filed: Jul. 29, 2008

Related U.S. Application Data

(63) Continuation of application No. 12/018,916, filed on Jan. 24, 2008.

(51) Int. Cl.
  *F16L 39/00* (2006.01)
(52) U.S. Cl. .................... 285/317; 285/308
(58) Field of Classification Search .......... 285/305, 285/308, 317, 309
  See application file for complete search history.

(56) References Cited

U.S. PATENT DOCUMENTS

| | | | | |
|---|---|---|---|---|
| 1,210,090 A | * | 12/1916 | Markham | 285/317 |
| 2,268,456 A | * | 12/1941 | Meyer | 285/317 |
| 2,420,866 A | * | 5/1947 | Coss | 285/317 |
| 2,660,456 A | * | 11/1953 | Meddock | 285/317 |
| 3,503,637 A | * | 3/1970 | Maeshiba | 285/317 |
| 4,138,148 A | * | 2/1979 | Zaremba | 285/317 |
| 4,494,270 A | * | 1/1985 | Ritzau et al. | 285/317 |
| 4,875,711 A | | 10/1989 | Watanabe | |
| 5,181,751 A | * | 1/1993 | Kitamura | 285/308 |
| 6,828,675 B2 | | 12/2004 | Memory et al. | |
| 7,159,797 B1 | * | 1/2007 | Lammers | 285/308 |
| 7,316,424 B2 | * | 1/2008 | Kardeis et al. | 285/308 |
| 7,338,092 B1 | | 3/2008 | Cicconi, III | |
| 7,434,844 B2 | * | 10/2008 | Kao | 285/317 |
| 2006/0065874 A1 | | 3/2006 | Campbell et al. | |
| 2007/0274043 A1 | | 11/2007 | Shabany | |

* cited by examiner

*Primary Examiner*—Aaron M Dunwoody
(74) *Attorney, Agent, or Firm*—Cantor Colburn LLP; Randall Bluestone

(57) ABSTRACT

A connector assembly for a fluid cooling system for electronic components includes a first spray shield half having an open end and including a slot disposed in an outer surface of the first spray shield half. A sled is disposed at least partially in the slot and articulable therein. The sled has a ramp portion extending radially inwardly from a sled base. A male quick-release connector is disposed at least partially within the first spray shield half. A second spray shield half is insertable between the first spray shield half and the male quick-release connector. A female quick-release connector is disposed at least partially within the second spray shield half. The female quick-release includes a release feature, wherein articulation of the sled toward the female quick-release connector is capable of activating the release feature and disconnecting the male quick-release connector from the female quick-release connector.

1 Claim, 6 Drawing Sheets

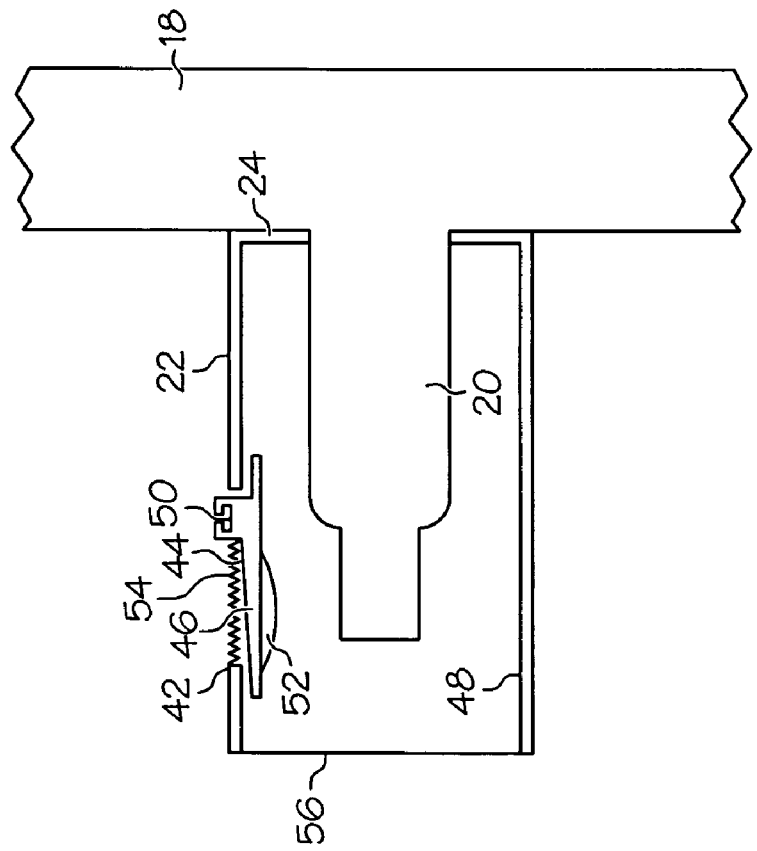
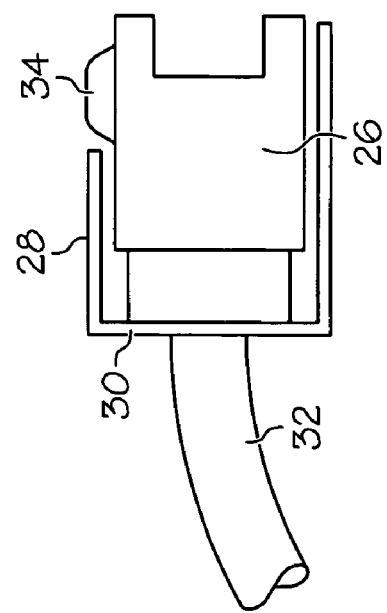
FIG. 2

CONNECTOR AND SPRAY SHIELD ASSEMBLY FOR LIQUID COOLING OF ELECTRONICS

CROSS REFERENCE TO RELATED APPLICATION

This application is a continuation in part/divisional application of U.S. Ser. No. 12/018,916, filed Jan. 24, 2008, the contents of which are incorporated by reference herein in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to electronic components, and particularly to connectors for liquid cooling of electronic components.

2. Description of Background

One method of cooling electronic components, for example, server components disposed in, for example a server rack, is via fluid circulated through the electronic components. The fluid is typically transported to the electronic components in tubing and/or piping and connected to the component with a quick release fitting. One drawback to fluid cooling systems, however, is the risk of electrical hazard from the possible inadvertent spray or splash of fluid onto an electronic component when connecting and/or disconnecting a fitting when servicing the electronic component.

SUMMARY OF THE INVENTION

The shortcomings of the prior art are overcome and additional advantages are provided through the provision of a connector assembly for a fluid cooling system for electronic components including a substantially cylindrically-shaped first spray shield half, the first spray shield half having an open end and including a slot disposed in an outer surface of the first spray shield half and a sled disposed at least partially in the slot and articulable therein, the sled having a ramp portion extending radially inwardly from a sled base. A male quick-release connector is disposed at least partially within the first spray shield half. The assembly includes a substantially cylindrically-shaped second spray shield half that is insertable between the first spray shield half and the male quick-release connector. A female quick-release connector is disposed at least partially within the second spray shield half. The female quick-release connector is connectable to the male quick-release connector and includes a release feature, wherein articulation of the sled toward the female quick-release connector is capable of activating the release feature and disconnecting the male quick-release connector from the female quick-release connector. A pull tab is in operable communication with the sled, and is capable of articulating the sled when pulled.

TECHNICAL EFFECTS

As a result of the summarized invention, technically we have achieved a solution which prevents cooling fluid from contacting electronics components when the connector assembly is disconnected. Further, the connector assembly requires no additional tools to disconnect.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of a cutaway view of the spray shield halves and the male and female quick-release connectors.

The detailed description explains the preferred embodiments of the invention, together with advantages and features, by way of example with reference to the drawings.

DETAILED DESCRIPTION OF THE INVENTION

Figure 1:
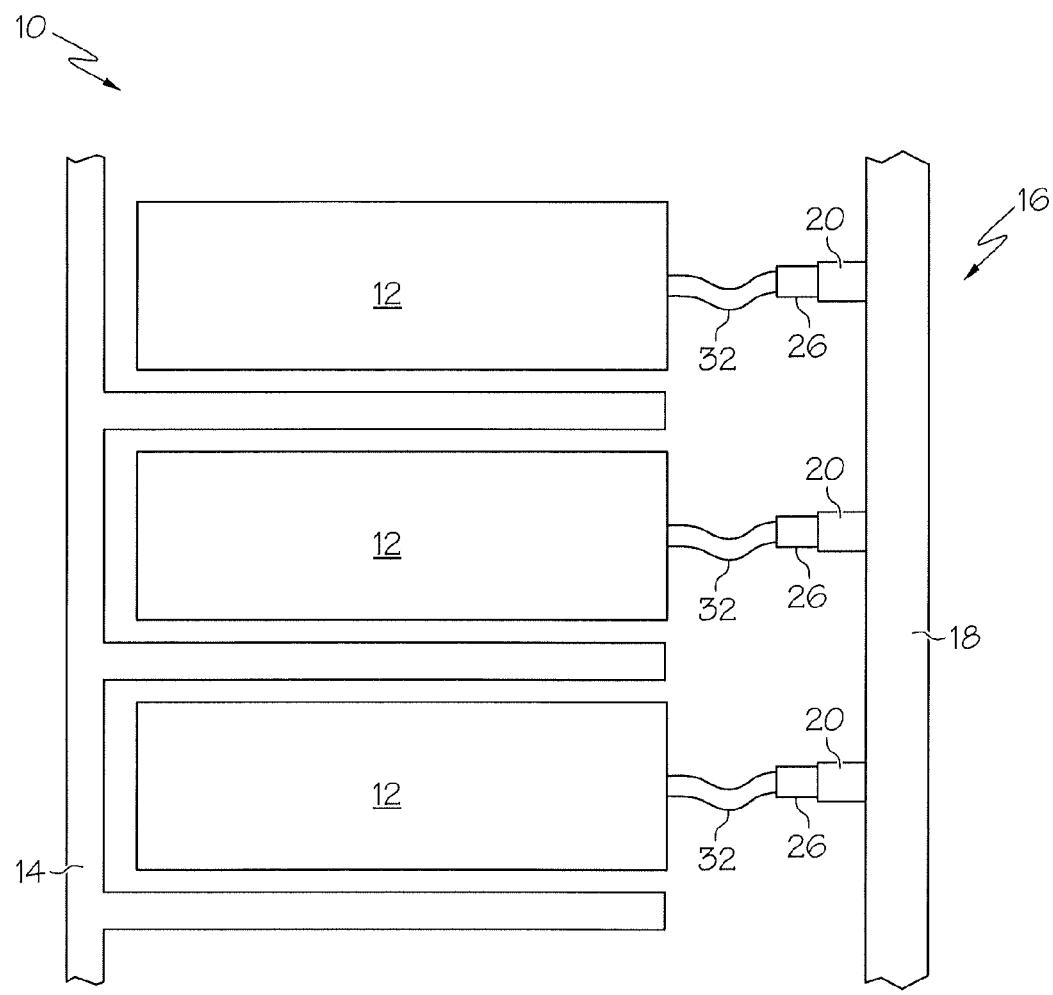
FIG. 1 illustrates one example of electronic components in a server rack.

Turning now to the drawings in greater detail, it will be seen that in FIG. 1 there is a server 10 including a plurality of electronic components 12 disposed in a server rack 14. The rack 14 includes a fluid manifold 16 which distributes cooling fluid, for example, water, to the electronic components 12. The server 10 may include an additional fluid manifold 16 for collecting fluid from the electronic components 12 after is has circulated through the electronic components 12. The fluid manifold 16 comprises tubing 18 formed from, for example, copper or polyvinyl chloride (PVC) and a plurality of male quick release connectors 20 extending from the tubing 18. The male quick release connectors 20 are in flow communication with the tubing 18 such that fluid may flow into or out of the tubing 18 and through the male quick release connectors 20. Referring now to FIG. 2, each male quick release connector 20 is disposed in a first spray shield half 22, which may be substantially cylindrical in shape. The first spray shield half 22 includes a first base 24 having a first base hole (not shown) through which the male quick release connector 20 is in flow communication with the tubing 18, either by a direct connection or, for example, via a connecting hose (not shown).

Figure 3:
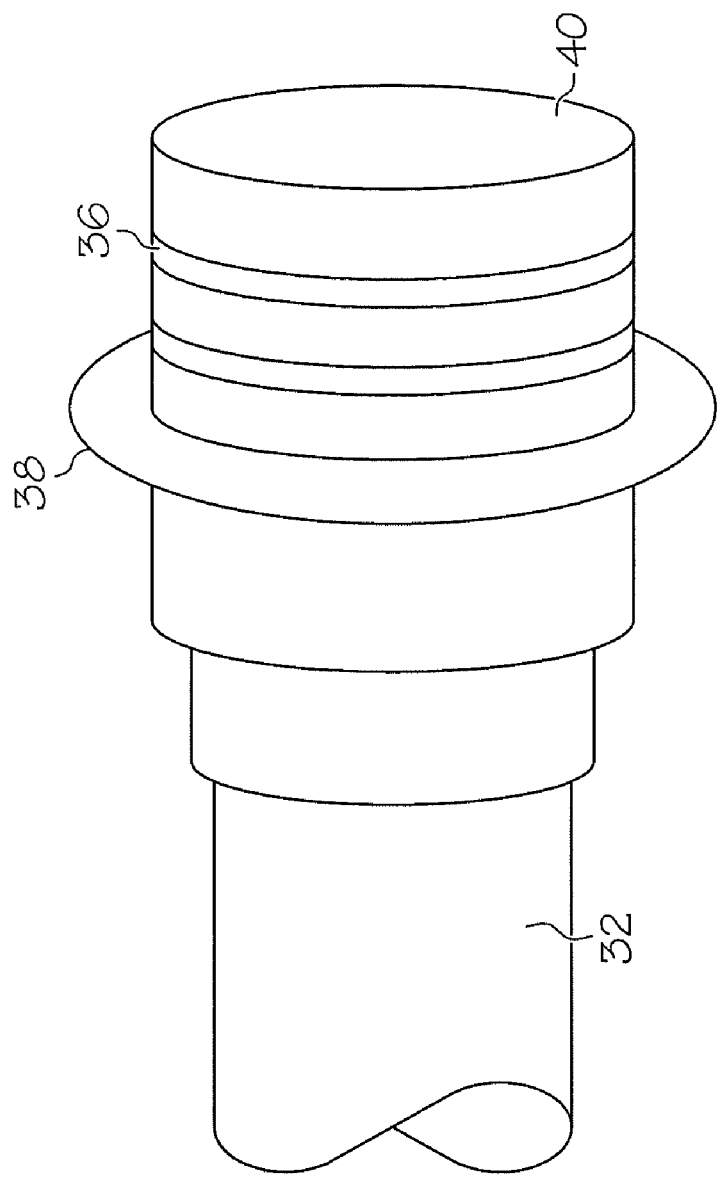
FIG. 3 illustrates one example of a possible configuration of a female quick-release connector.

A female quick release connector 26 is disposed in a second spray shield half 28. The second spray shield half 28 is, in some embodiments, substantially cylindrical, and includes a second base 30 having a second base hole (not shown) through which the female quick release connector 26 is in flow communication with, for example, an electronic component 12 either directly or indirectly via, for example, a connecting hose 32. The female quick release connector 26 shown in FIG. 2 includes a release button 34 which, when depressed, is capable of disconnecting the male quick release connector 20 from a female quick release connector 26. An alternative configuration female quick release connector 36 is shown in FIG. 3. The female quick release connector 36 includes a collar release feature 38 which, when articulated away from a connector end 40, is capable of disconnecting the male quick release connector 20 from the female quick release connector 36. The two female connector configurations shown are merely examples, and it is to be appreciated that other connector release configurations are contemplated within the present scope.

Referring again to FIG. 2, the first spray shield half 22 includes a tab slot 42 which in some embodiments extends substantially longitudinally along the first spray shield half 22. A spray shield sled 44 is disposed in the first spray shield half 22. The spray shield sled 44 includes a sled base 46 disposed at an inner surface 48 of the first spray shield half 22 and a pull tab hook 50 which extends radially outwardly from the sled base 46 through the tab slot 42 to an exterior of the first spray shield half 22. A release ramp 52 is disposed at the sled base 46 and extends radially inwardly toward the male quick release connector 20. A spring 54 is disposed in the first spray shield half 22 and is connected to the spray shield sled 44 to bias a position of the spray shield sled 44 away from the open end 57 of the first spray shield half 22.

When the female quick release connector 26 is brought into connection with the male quick release connector 20, the second spray shield half 28 is insertable inside of the first spray shield half 22, radially between the male quick release connector 20 and the first spray shield half 22. The second spray shield half 28 includes an access slot 56 which is disposed to prevent interference between the release ramp 52 and the second spray shield half 28 and allow the release ramp access to the release button 34.

When the spray shield sled 44 is articulated toward the open end 36 compressing the spring 54, the release ramp 52 moves into an interference condition with the release button 34 on the female quick release connector 26. The release ramp 52 depresses the release button 34 thereby disconnecting the female quick release connector 26 from the male quick release connector 20.

Figure 4:
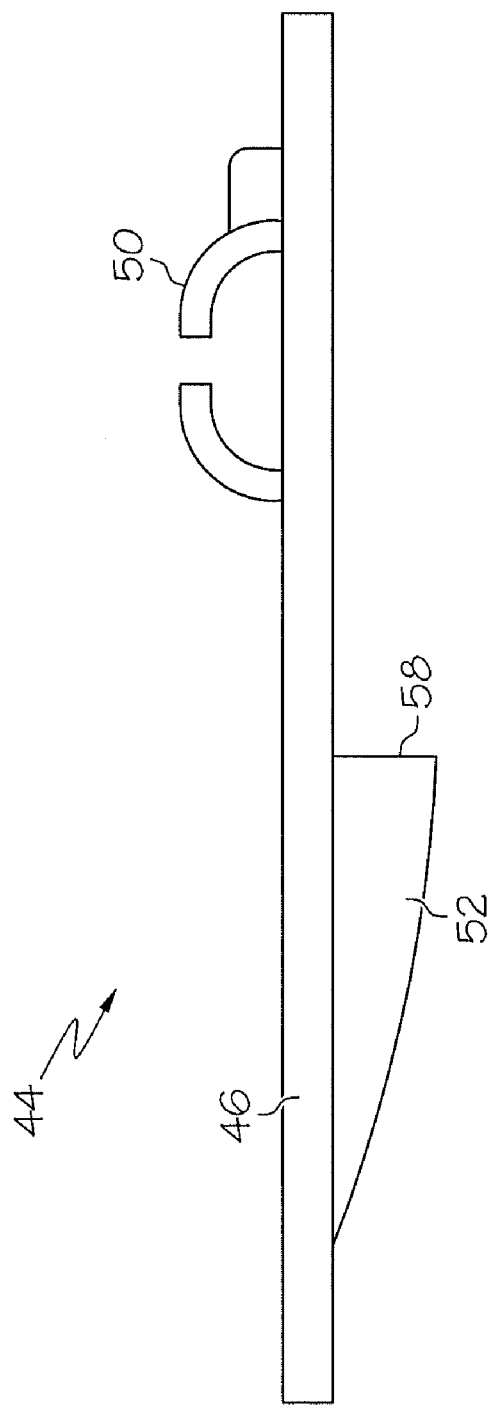
FIG. 4 illustrates one example of a possible configuration of a spray shield sled.

As shown in FIG. 4, in the case of the female quick release connector 36 having the collar release feature 38, the release ramp 52 includes a release face 58 which extends substantially perpendicular to the sled base 46 to provide sufficient engagement with the collar release feature 38 to articulate the collar release feature 38 away from the connector end 40 in order to disconnect the female quick-release connector 36 from the male quick-release connector 20.

Figure 5:
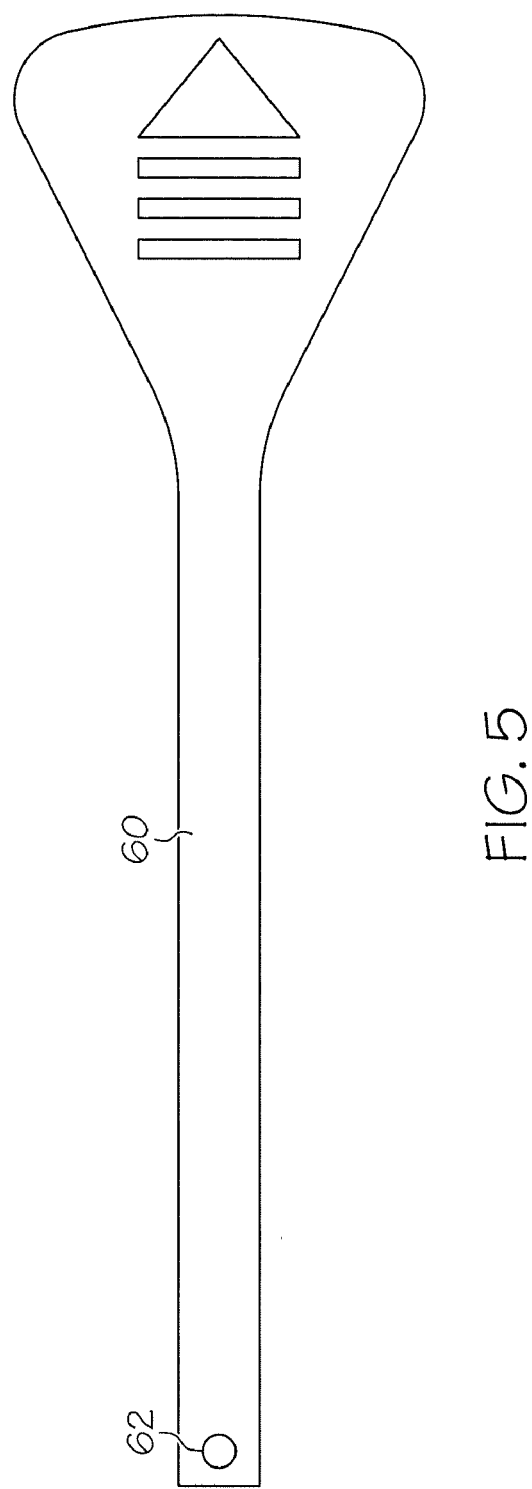
FIG. 5 illustrates a pull tab for an embodiment of a spray shield.

To increase ease of operation of the spray shield sled 44, some embodiments as shown in FIG. 5, include a pull tab 60 that is inserted into the pull tab hook 50 by a pull tab hole 62. The pull tab 60 is used to articulate the spray shield sled toward the open end 36. The length of the pull tab 60 may be modified depending on the reach necessary to operate the spray shield sled 44. The use of the pull tab 60 allows for extended reach into limited access areas to operate the spray shield sled 44 and disconnect the quick release connector.

Figure 6:
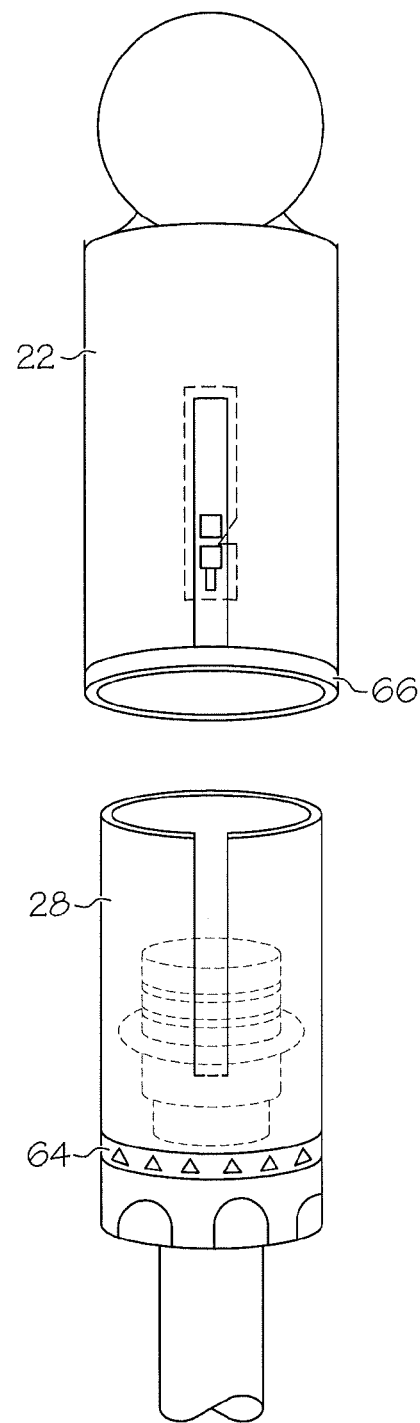
FIG. 6 illustrates an embodiment of a spray shield having a visual connection indicator.

In some embodiments, as shown in FIG. 6, the second spray shield half 28 includes a visual indicator 64, for example a line around a perimeter of the second spray shield half 28. A similar indicator band 66 is included on the first spray shield half 22, and is configured such that when the indicator band 66 covers the visual indicator 64 from view, the male quick release connector 20 is positively connected to the female quick release connector 26.

Utilization of the overlapping first spray shield half 22 and second spray shield half 28 prevent cooling fluid from inadvertently spraying on a nearby electronic component 12, and the fluid which leaks or sprays during connection and/or disconnection is collected in the first spray shield half 22 and/or second spray shield half 28.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A connector assembly for a fluid cooling system for electronic components comprising:
 a substantially cylindrically-shaped first spray shield half, the first spray shield half having an open end and including:
  a slot disposed in an outer surface of the first spray shield half;
  a sled disposed at least partially in the slot and articulable therein, the sled having a ramp portion extending radially inwardly from a sled base;
 a male quick-release connector disposed at least partially within the first spray shield half;
 a substantially cylindrically-shaped second spray shield half insertable between the first spray shield half and the male quick-release connector;
 a female quick-release connector disposed at least partially within the second spray shield half, the female quick-release connector connectable to the male quick-release connector and including a release feature, wherein articulation of the sled toward the female quick-release connector is capable of activating the release feature and disconnecting the male quick-release connector from the female quick-release connector;
 a spring disposed in the first spray shield half and is connected to the spray shield sled to bias a position of the spray shield sled away from the open end of the first spray shield half; and
 a pull tab in operable communication with the sled, the pull tab capable of articulating the sled when pulled.

* * * * *